United States Patent [19]
Kogler et al.

[11] 4,116,055
[45] Sep. 26, 1978

[54] TIRE INSPECTING APPARATUS

[75] Inventors: Horst Kogler, Dieburg; Herwig Hönlinger, Gross-Rohrheim; Günther Himmler, Darmstadt; Günter Knoll, Buttelborn, all of Germany

[73] Assignee: Gebr. Hofmann, G.m.b.H. & Co., Maschinenfabrik, Darmstadt, Germany

[21] Appl. No.: 847,027

[22] Filed: Oct. 31, 1977

[30] Foreign Application Priority Data

Nov. 26, 1976 [DE] Fed. Rep. of Germany ....... 2653700

[51] Int. Cl.² .......................................... G01M 17/02
[52] U.S. Cl. ...................................................... 73/146
[58] Field of Search ........................................... 73/146

[56] References Cited

U.S. PATENT DOCUMENTS 3,698,233  10/1972  Braden et al. ........................... 73/146
4,004,693  1/1977   Tsuji et al. ............................. 73/146

Primary Examiner—Donald O. Woodiel
Attorney, Agent, or Firm—Cushman, Darby & Cushman

[57] ABSTRACT

Apparatus for automatically inspecting and moving tires through an inspection system. The tire is placed in a pan of sand and is rotated by a device grasping the bead of the tire so that the tire becomes embedded in the sand in order to stabilize its position. A covering hood, with an attached mirror, is aligned upon lowering with the aid of conical centering guides. After the tire has been inspected and removed, a rotary shovel smooths the sand so that the pan is ready to accept another tire for inspection.

7 Claims, 4 Drawing Figures

TIRE INSPECTING APPARATUS

The invention relates to apparatus for the automatic inspection of tires, expecially vehicle and airplane tires, for faulty spots, in which the tire is moved through the testing station by means of transfer apparatus, and is observed by means of holographic interferometry.

Tire inspection apparatus which examines tires by means of holographic interferometry is disclosed in German patent applications Nos. P 26 15 081.2 and P 26 41 516.7. Furthermore, transfer apparatus is known in the field of tire inspection engineering which moves tires to or from the actual testing station. In order to move a tire quickly, simply and automatically into a testing station, the space provided therefor must be free of testing and auxiliary apparatus. German patent application No. P 26 41 516.7 discloses an unsuitable arrangement since the position of the conic mirror is fixed within the observation area. On the other hand, during testing, the conic mirror must be carefully placed within the observation system to eliminate distortions of the depicted surface. Also the tire must remain absolutely stationary during examination so that no disturbing interference lines develop as a result of tire movement.

It, therefore, is an object of this invention to provide an arrangement for automatically inspecting tires, whereby stabilization of the tire during examination is assured. This is achieved through a transfer system with several removable pans which are filled with particulate material, such as sand to stabilize the tire. Also the conic mirror of the observation system is connected to a covering hood and may be lifted together with the hood. However, during lowering, the mirror is aligned with respect to the base plate independent of the position of the covering hood.

In one embodiment, the tire is embedded into the sand bed of the pan by means of a rotating arrangement which attaches to the bead of the tire. In another embodiment, the beads of the tire are forced apart after the tire has been embedded into the sandbed, in order to make possible the insertion of bars for maintaining the spread of the tire. In order to seat the tires in an optimum testing position, the sand is redistributed after each testing process by a sand processing station which consists of a driving unit and a rotary shovel employed as a rake.

These and other objects and advantages of the invention will become more apparent and more readily appreciated from the following detailed description of the presently preferred exemplary embodiment of the invention taken in conjunction with the accompanying drawings, of which:

Figure 1:
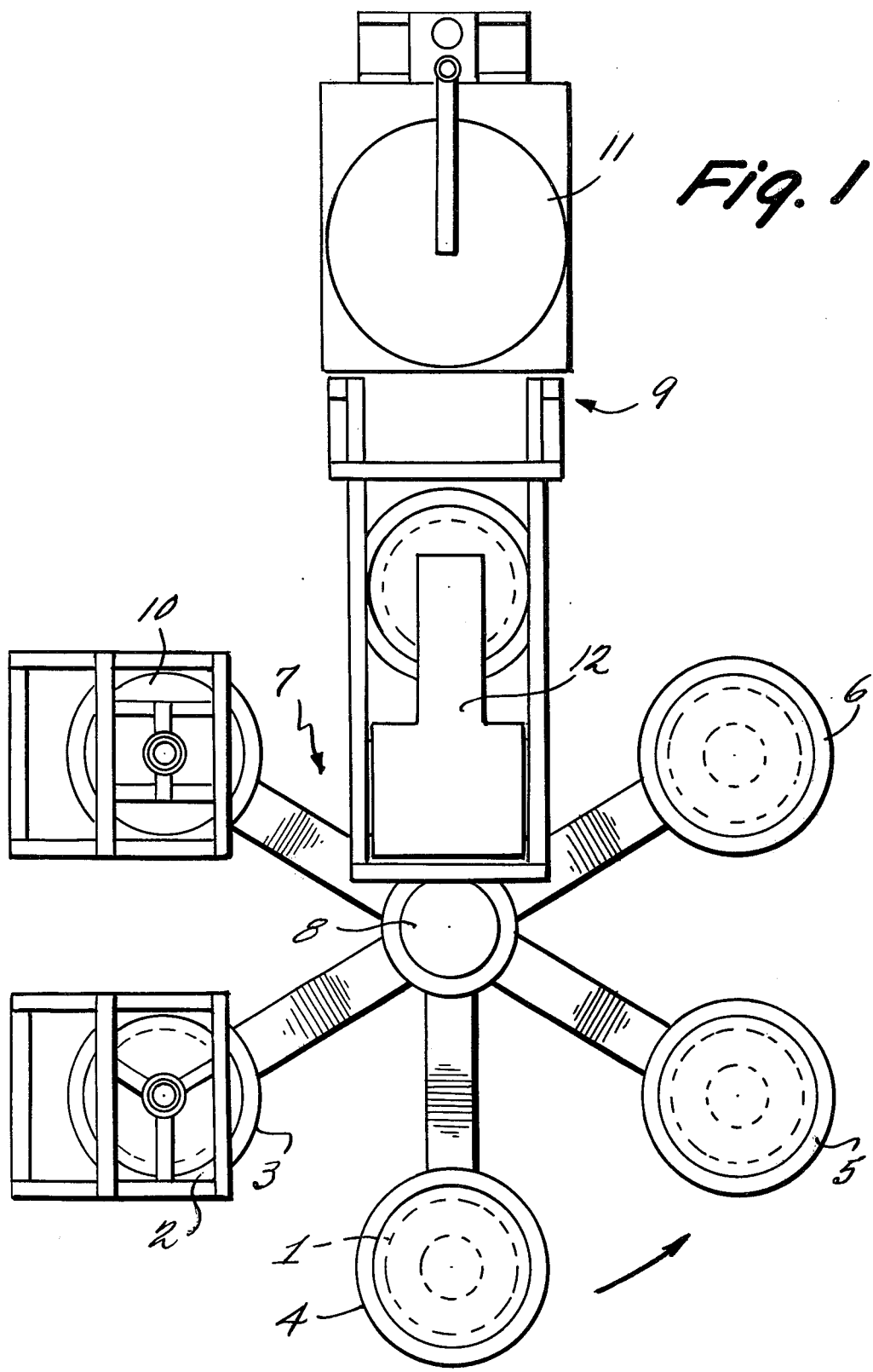
FIG. 1 shows schematically a top view of the tire inspection installation.

In FIG. 1, tire 1 is inserted manually or automatically into pan 3 in charging station 2 and is embedded by arrapatus described below in more detail. In the following stations 4, 5 and 6, tire 1 has time to completely settle. It has been found that three stations with a cycle time of 1 minute per station provides sufficient time for settling. A circular transfer apparatus 7 is best suited for transporting the tires, since driving element 8 may then be centrally positioned. The actual testing station 9, the discharge station and sand processing station 10, complete the testing installation. Individual pans have been removably attached to circular transfer apparatus 7 so that movement of the tire-pan assembly into holographic testing area 11 is possible.

Figure 2:
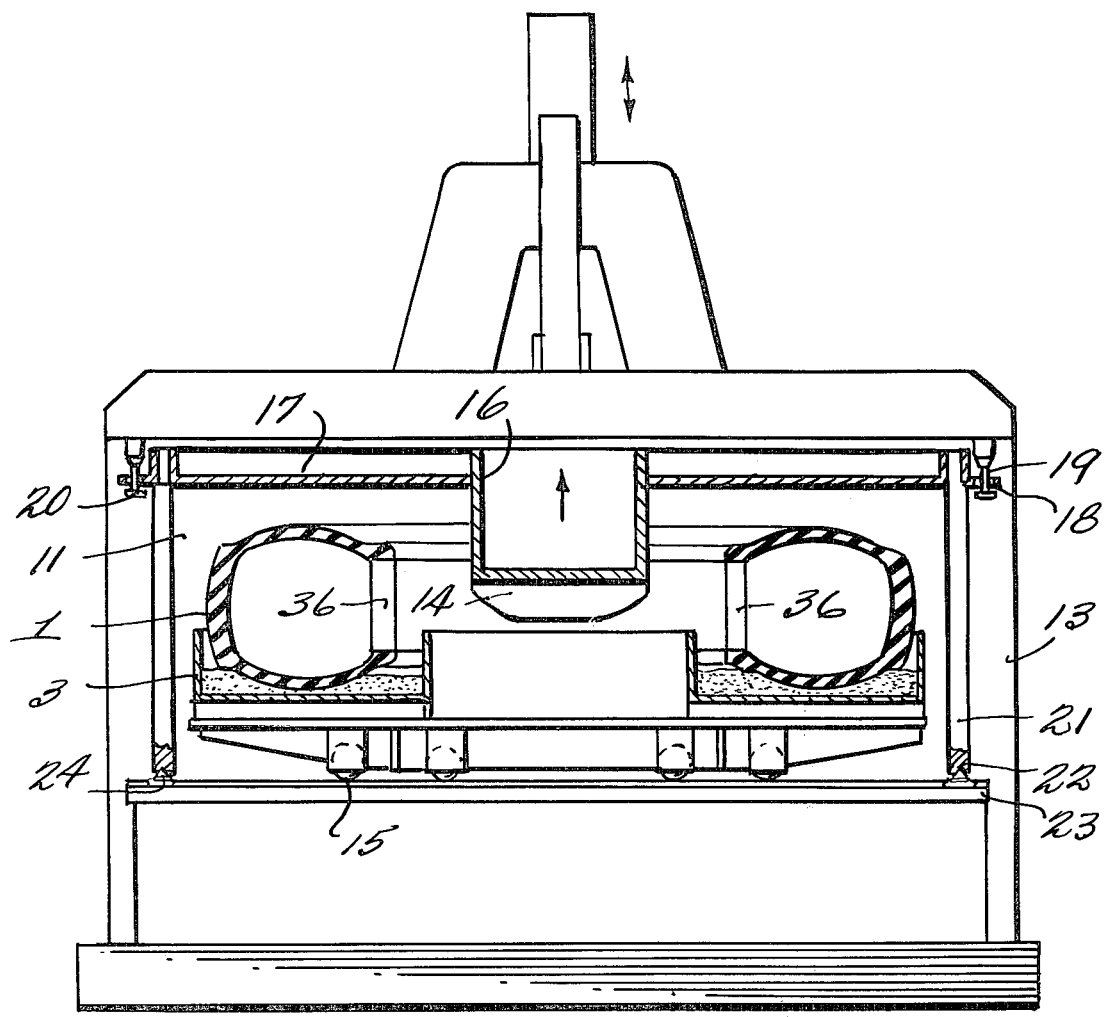
FIG. 2 represents schematically a side view of the testing station.

FIG. 2 illustrates a part of testing station 9, without the actual observation system shown in detail. Preferably, apparatus as in German patent application No. P 26 41 516.7 is used for the actual inspection process. In operation, covering hood 13 is lifted vertically, and conic mirror 14 is simultaneously removed from the area of tire movement so that tire 1 and pan 3, supported by rollers 15, may be conveyed by longitudinal transfer apparatus 12 into holographic testing area 11 unimpeded.

Conic mirror 14 is attached to pipe 16 and the latter, in turn, is attached to plate 17. On the periphery of plate 17, bores 18 have been provided with which bolts 19 engage. Bolts 19 are attached to covering hood 13, and have extensions 20 which are larger than bores 18. Furthermore, supporting bars 21 are attached to plate 17 which have concave cones 22 at their lower end.

After moving tire 1 and pan 3 into testing area 11, covering hood 13, together with conic mirror 14, is lowered, so that supporting bars 21 set upon convex cones 24 attached to base plate 23, precisely centering the covering hood 13 and mirror 14. Covering hood 13 is lowered further until bolts 18 release plate 17 and the outside edge of the covering hood 13 encloses the entire testing area 11 in an airtight manner. Conic mirror 14 now lies precisely in the path of rays of the laser beam of the observation system which has not been shown, but which is known, so that the position is not influenced by deformations of covering hood 13.

Figure 3:
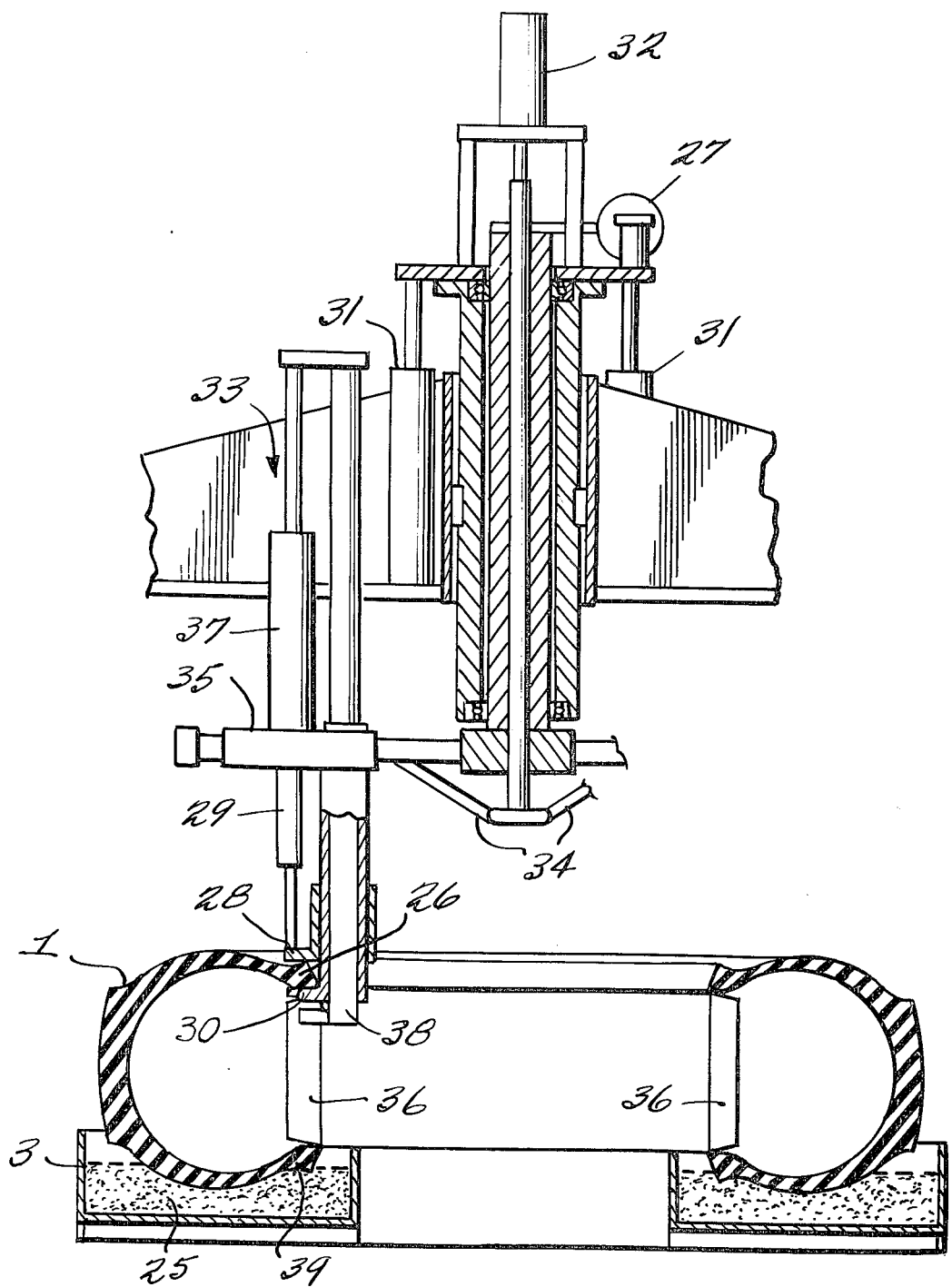
FIG. 3 shows schematically the embedding of the tire into the pan.

FIG. 3 illustrates charging station 2 after tire 1 has been put into pan 3, which is filled with sand 25 to ensure the optimum stabilization of tire 1. After insertion of tire 1 in pan 3, upper tire bead 26 is grasped and tire 1 is rotated into the bed of sand 25 by a rotating drive or hydraulic unit 27 which executes a reciprocating movement. Tire spreading bars 36 are inserted, permitting better observation of the inside of tire 1, by grasping upper tire bead 26 and moving arm 38 downwards by operation of cylinder 37, so that the two tire beads 26 and 39 are forced apart until bar 36 may be inserted. The grasping apparatus for upper tire bead 26 consists of individual arms separately controlled. Arms 28 and 30 press the top and bottom of tire bead 26 as controlled by cylinders 29 and 31, respectively. Cylinders 31 are preadjusted for the appropriate tire width. Unit 33 may be moved radially by means of cylinder 32 on carriage 35 as controlled by toggle lever 34 to adjust the apparatus for the variable diameters of the beads. After the tire had been prepared for the examination, it passes through the stations 4, 5 and 6 during which time the position of the tire stabilizes.

Figure 4:
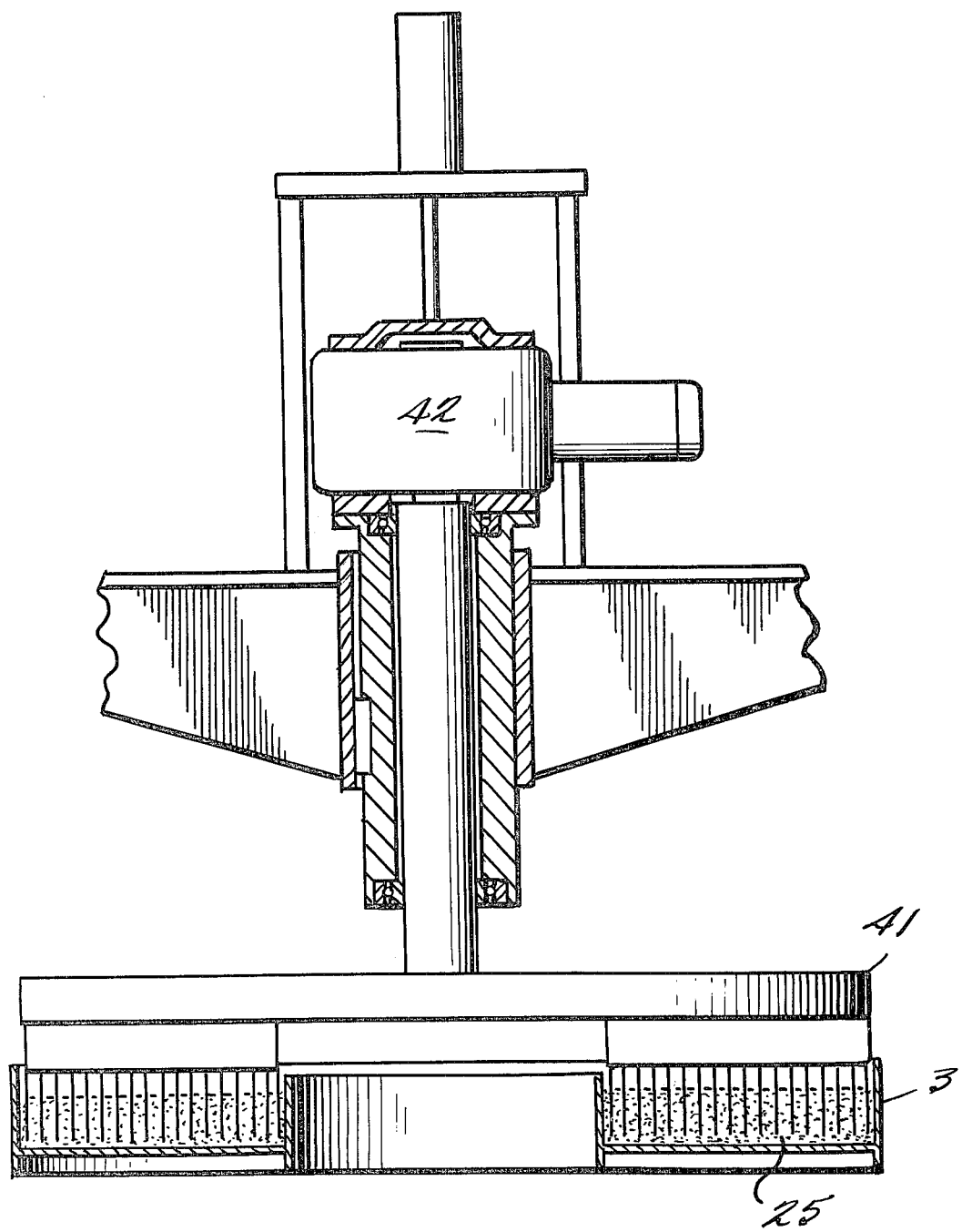
FIG. 4 shows schematically a side view of the sand processing station.

After the examination process, tire 1 is manually or automatically removed from pan 3 in discharge and sand processing station 10. Rotating shovel 41, which may be designed as a rake and which is adapted to pan 3, moves from above into sand bed 25 and by rotary movement produced by driving motor 42 (See FIG. 4), redistributes the sand. As a result, sand 25 is smoothed and prepared for the next testing process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. Apparatus for the automatic inspection of tires in an inspection area comprising:
   means for moving a tire through said inspection area;
   a plurality of pans each attached to said moving means for holding a tire;
   particulate material partially filling said pans for the stabilization of the position of said tires in said pans;
   a base plate in said inspection area;
   a means for covering said tire when said tire is in said inspection area including a covering hood having a top;
   a mirror attached to said covering means;
   means for lifting said mirror and said covering hood to permit entry of said tire into and removal of said tire from said inspection area; and
   means for centering said mirror and said covering hood with respect to said base plate.

2. Apparatus as in claim 1, further comprising:
   means for grasping a bead of said tire; and
   means for rotating said tire so that said tire is inserted into said particulate material of said pan.

3. Apparatus as in claim 1 wherein said particulate material is sand.

4. Apparatus as in claim 1, further comprising:
   means for maintaining a wide separation of the beads of said tire so as to aid in inspection;
   means for initially forcing apart said beads; and
   means for inserting said maintaining means after said forcing means have separated said beads.

5. Apparatus as in claim 3, further comprising:
   a rotary shovel for smoothing said sand after said tire is removed; and
   means for driving said shovel.

6. Apparatus as in claim 5 wherein said rotary shovel is a rake.

7. Apparatus as in claim 1, wherein said covering means further includes:
   vertical bolts attached to said top of the inner-surface of said covering hood;
   a plate, guided by and vertically mobile on said bolts, said mirror being attached to said plate, said bolts supporting said plate and said mirror when said covering hood is in a raised position; and
   means for supporting said plate and said mirror when said covering hood is in a lowered position.

* * * * *